(12) United States Patent
Haugvaldstad

(10) Patent No.: US 8,276,805 B2
(45) Date of Patent: Oct. 2, 2012

(54) METHOD AND SYSTEM FOR BRAZING

(75) Inventor: Kjell Haugvaldstad, Vanvikan (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/328,406

(22) Filed: Dec. 4, 2008

(65) Prior Publication Data

US 2010/0140329 A1 Jun. 10, 2010

(51) Int. Cl.
B23K 35/12 (2006.01)
(52) U.S. Cl. ........................ 228/249; 228/245
(58) Field of Classification Search ............... 228/122.1, 228/245, 246, 249, 251, 44.3, 49.1
See application file for complete search history.

(56) References Cited

U.S. PATENT DOCUMENTS

| | | | | |
|---|---|---|---|---|
| 2,572,593 | A | * | 10/1951 | Brown, Jr. .................. 228/44.3 |
| 3,941,299 | A | * | 3/1976 | Godfrey ........................ 228/219 |
| 4,156,329 | A | * | 5/1979 | Daniels et al. ................... 51/295 |
| 4,350,215 | A | | 9/1982 | Radtke |
| 4,688,652 | A | | 8/1987 | Crist |
| 4,711,144 | A | * | 12/1987 | Barr et al. .................. 76/108.2 |
| 5,113,953 | A | | 5/1992 | Noble et al. |
| 5,265,682 | A | | 11/1993 | Russell et al. |
| 5,520,255 | A | | 5/1996 | Barr et al. |
| 5,553,678 | A | | 9/1996 | Barr et al. |
| 5,553,679 | A | | 9/1996 | Thorp et al. |
| 5,582,259 | A | | 12/1996 | Barr et al. |
| 5,603,385 | A | | 2/1997 | Colebrook et al. |
| 5,673,763 | A | | 10/1997 | Thorp et al. |
| 5,685,379 | A | | 11/1997 | Barr et al. |
| 5,695,015 | A | | 12/1997 | Barr et al. |
| 5,706,905 | A | | 1/1998 | Barr et al. |
| 5,778,992 | A | | 7/1998 | Fuller et al. |
| 5,803,185 | A | | 9/1998 | Barr et al. |
| 5,878,634 | A | * | 3/1999 | Tibbitts ........................ 76/108.2 |
| 5,971,085 | A | | 10/1999 | Colebrook et al. |
| 6,089,332 | A | | 7/2000 | Barr et al. |
| 6,092,610 | A | | 7/2000 | Kosmala et al. |
| 6,158,529 | A | | 12/2000 | Dorel |
| 6,244,361 | B1 | | 6/2001 | Comeau et al. |
| 6,364,034 | B1 | | 4/2002 | Schoeffler |
| 6,394,193 | B1 | | 5/2002 | Askew |
| 7,389,834 | B1 | | 6/2008 | Kembaiyan |
| 2001/0052428 | A1 | | 12/2001 | Larronde et al. |
| 2002/0011359 | A1 | | 1/2002 | Webb et al. |

FOREIGN PATENT DOCUMENTS

GB 2409209 A 6/2005

OTHER PUBLICATIONS

International Search Report dated Apirl 22, 2010 in the corresponding PCT Application PCT/IB2009/007756, filed Dec. 2, 2009.

* cited by examiner

*Primary Examiner* — Maria Veronica Ewald
*Assistant Examiner* — Megha Mehta

(57) ABSTRACT

This invention provides methods and systems for brazing. One aspect of the invention provides a method of brazing cutter teeth. The method includes providing a bit body, pressing at least one cutter against the bit body with a spring device, placing the bit body and the at least one cutter in an inert gas filled chamber with about 10% $H_2$, and heating the chamber to a temperature above the melting point of the filler metal thereby melting the filler metal. A quantity of filler metal is held between each of the at least one cutters and the bit body.

17 Claims, 4 Drawing Sheets

METHOD AND SYSTEM FOR BRAZING

FIELD OF THE INVENTION

The present invention relates to methods and system for brazing cutter teeth to a bit body, for example, for use underground drilling.

BACKGROUND OF THE INVENTION

Many drilling systems include bit bodies having one or more cutters, which allow for more aggressive drilling. The cutters and bit body subjected to extreme forces during drilling operations. Accordingly, the cutters must be firmly attached to the bit body.

Cutters are often attached to the bit body by brazing. The existing process for brazing is labor intensive and produces unpredictable results. The existing process requires a preheated bit body and three operators. A first operator adds silver to the braze with a torch. A second operator uses a rod to apply force to the cutters to secure its position. A third operator maintains the base temperature of the bit body with a torch. The existing process is a physically and mentally demanding task that exposes operators to intense heat and is very dependent on the skill and performance of each operator. With up to 100 cutters to braze on a bit body, even one bad braze will reduce the performance of the bit.

Additionally, the existing process is conducted in a natural atmosphere, which requires the use of flux to minimize oxidation. The use of flux creates a risk that flux will be encapsulated by the silver, thereby significantly reducing the strength of the braze.

Moreover, the temperature of the bit and cutter is critical for the quality of the braze. Conventional oxyacetylene torches produce core temperatures of 3,000-4,000° C., resulting in significant variations in temperature of the bit body and the cutters. These temperature fluctuations increase the risk of correcting the position of a cutter when the silver is cooling. If cutters are moved during solidification of the silver, the strength of the silver brazing may be reduced significantly.

Accordingly, there is a need for a new method of brazing that both requires less manual labor and produces a more reliable braze.

SUMMARY OF THE INVENTION

This invention provides methods and systems for brazing.

One aspect of the invention provides a method of brazing cutter teeth. The method includes providing a bit body, pressing at least one cutter against the bit body with a spring device, placing the bit body and the at least one cutter in an inert gas filled chamber with about 10% $H_2$, and heating the chamber to a temperature above the melting point of the filler metal thereby melting the filler metal. A quantity of filler metal is held between each of the at least one cutters and the bit body.

This aspect can have several embodiments. The bit body can have a interior cavity and the method can include: introducing a heating element into the interior cavity of the bit body and heating the bit body with the heating element. The heating element can be an induction coil. The bit body can be heated in a controlled manner. The method can result in a brazing thickness of about 0.06 mm. The chamber can be heated in a controlled manner.

The cutter teeth can comprise polycrystalline diamond. The filler metal can be silver. The filler metal can be pretinned to the cutter teeth. The cutter teeth can be brazed in the absence of flux. The inert gas can be $N_2$. The chamber can be heated to about 700° C.

Another aspect of the invention provides a method of brazing cutter teeth. The method includes providing a bit body, the bit body having an interior cavity; pressing at least one cutter against the bit body with a spring device, wherein a quantity of silver is held between each of the at least one cutters and the bit body; placing the bit body and the at least one cutter in an inert gas filled chamber with about 10% $H_2$; and placing an induction element in the interior cavity of the bit body to heat the bit body in a controlled manner; heating the chamber to a temperature above the melting point of silver thereby melting the silver.

This aspect can have several embodiments. The method can result in a brazing thickness of about 0.06 mm. The cutter teeth can comprise polycrystalline diamond. The silver can be pretinned to the cutter teeth. The cutter teeth can be brazed in the absence of flux.

Another aspect of the invention provides a system for brazing cutter teeth. The system includes: a chamber adapted to receive a bit body, a heating element configured to heat the chamber, an inert gas source configured to fill the chamber with an inert gas, and a spring device configured to press a plurality of cutting teeth against the bit body.

DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE INVENTION

This invention provides methods and systems for brazing. Embodiments of the invention can be used to produce a bit body for use in a wellsite system.

Wellsite System

Figure 1:
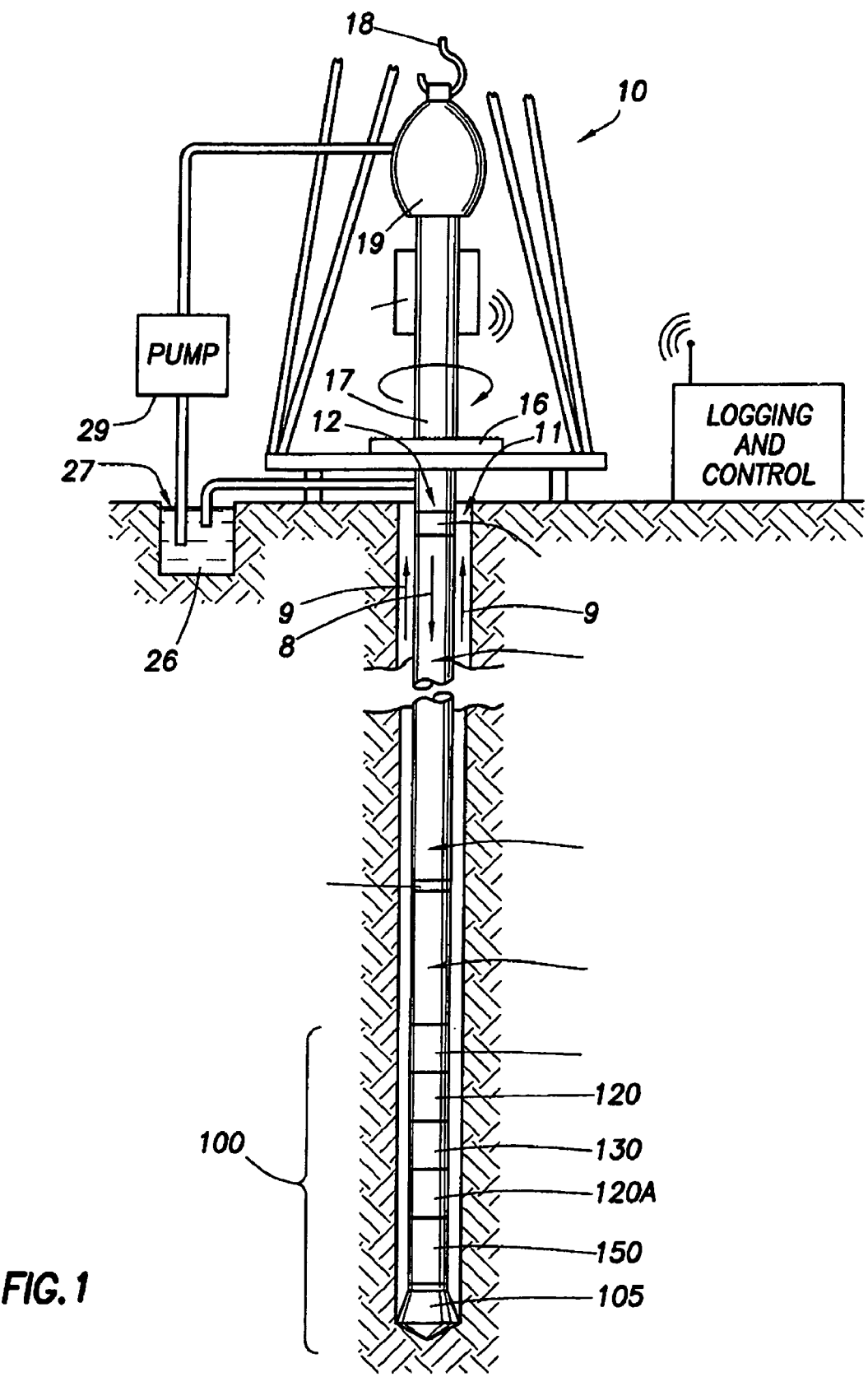
FIG. 1 illustrates a wellsite system in which the present invention can be employed.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a pressure measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling." In this embodiment, a roto-steerable subsystem 150 (FIG. 1) is provided. Directional drilling is the intentional deviation of the wellbore from the path it would naturally take. In other words, directional drilling is the steering of the drill string so that it travels in a desired direction.

Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well.

A directional drilling system may also be used in vertical drilling operation as well. Often the drill bit will veer off of an planned drilling trajectory because of the unpredictable nature of the formations being penetrated or the varying forces that the drill bit experiences. When such a deviation occurs, a directional drilling system may be used to put the drill bit back on course.

A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems.

In the point-the-bit system, the axis of rotation of the drill bit is deviated from the local axis of the bottom hole assembly in the general direction of the new hole. The hole is propagated in accordance with the customary three-point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953.

In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form the drill bit is required to cut sideways in order to generate a curved hole. Examples of push-the-bit type rotary steerable systems, and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; and 5,971,085.

Brazing Methods

Figure 2:
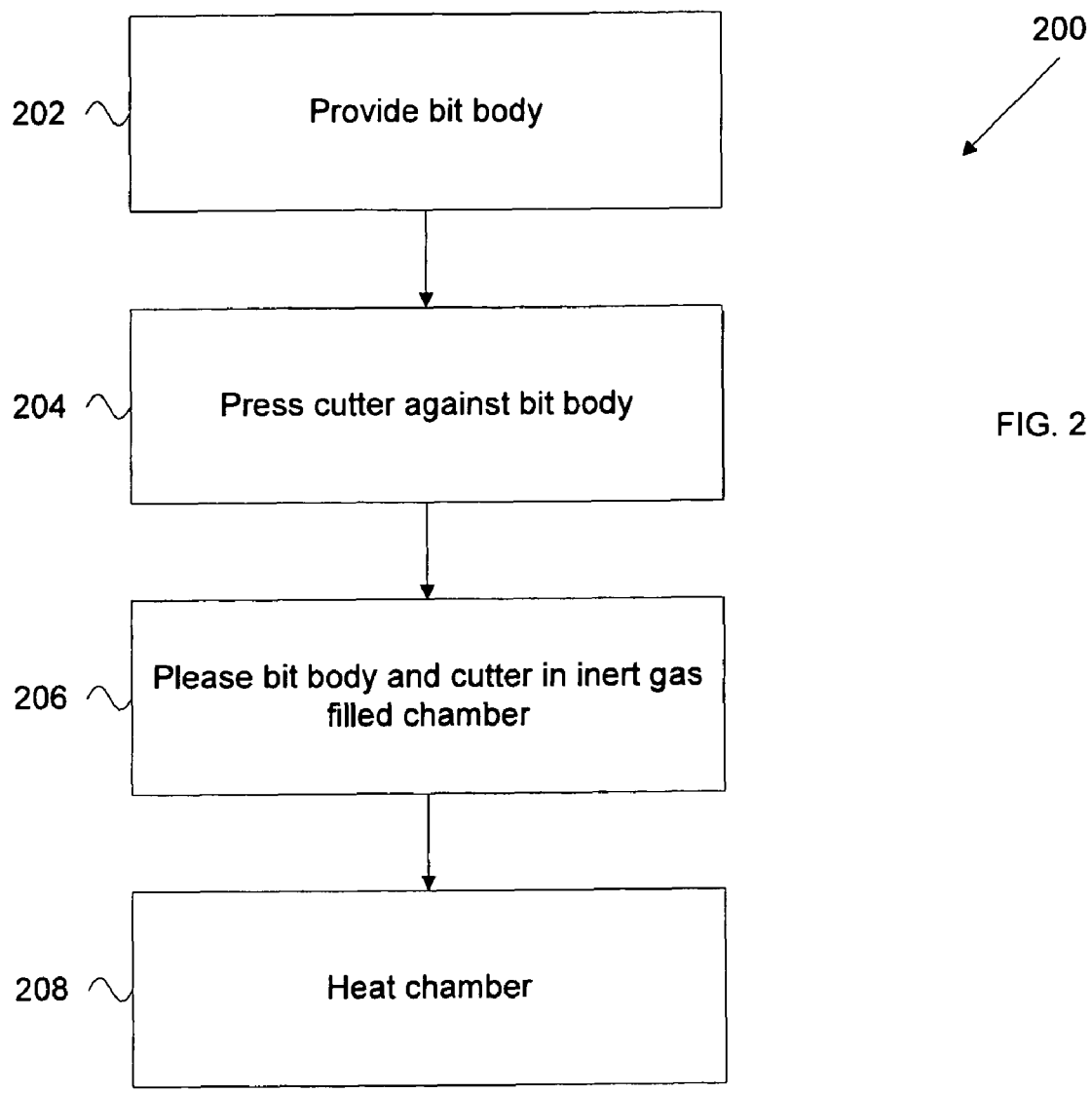
FIG. 2 depicts a method of brazing.

Referring to FIG. 2, the invention provides methods for brazing. In step 202, a bit body is provided. The bit body can be any material suitable for brazing and/or drilling such as steel, "high speed steel", carbon steel, brass, copper, iron, and the like.

In step 204, at least one cutter is pressed against the bit body by a spring device. The cutters are preferably a hardened material such as polycrystalline diamond compact (PDC), ceramics, carbides, cermets, and the like. The spring device can be any device capable of pressing a cutter against the bit body while withstanding brazing temperatures. A quantity of filler metal is held between each cutter and the bit body by compression from the spring device.

Filler metals are available from a variety of sources including the Aufhauser Corporation of Plainview, N.Y. and the Harris Products Group of Mason, Ohio and are described in publications such as the *CRC Handbook of Chemistry and Physics*. In some embodiments, the filler metal is silver, nickel-silver, bronze, or brass. The filler metal can be pretinned (i.e. applied with a brazing torch) to the cutter teeth.

In step 206, the bit body and the one or more cutters are placed in an inert gas filled chamber with about 10% hydrogen gas ($H_2$). The inert gas can include at least one of nitrogen ($N_2$), helium (He), neon (Ne), argon (Ar), krypton (Kr), xenon (Xe), and/or radon (Rn).

In step 208, the chamber is heated to a temperature above the melting point or the liquidus and/or within the brazing range of the filler metal to melt the filler metal. The melting point and liquidus for various filler metals and alloys is known to those of skill in the art and available from various treatises and reference materials, including manufacturer specifications for alloys. For example, when the filler material is silver, the chamber is heated to about 720° C. In some embodiments, particularly where the filler metal is an alloy including copper, silver, and/or nickel, brazing may be conducted below the liquidus so that the filler metal does not completely melt.

The chamber can be heated by any heater known to those of skill in the art. For example, the heater can be an electric heater, a gas heater, a hydronic heater, an induction coil, an induction heater, an infrared heater, a kerosene heater, an oil heater, a solar heater, a wood heater, and the like.

In some embodiments of the invention, the bit body has an interior cavity. The method can include introducing a heater into the interior cavity of the bit body and heating the bit body with the heating element. The placing of a heater in the interior cavity promotes uniform heating by heating the bit body from both the inside and the outside.

In some embodiments, the method results in a brazing thickness of about 0.06 mm.

The chamber can be heated and/or cooled in controlled manner. The term "controlled manner" includes any heating or cooling process that does not adversely affect the bit body, the cutters, or the filler metal. For example, a controlled heating or cooling process can achieve the desired temperature without altering the physical properties of the bit body such as the iron alloy phase.

As a result of the method described herein, brazing can be accomplished without the need for flux, thereby producing a higher quality braze.

Brazing System

Figure 3:
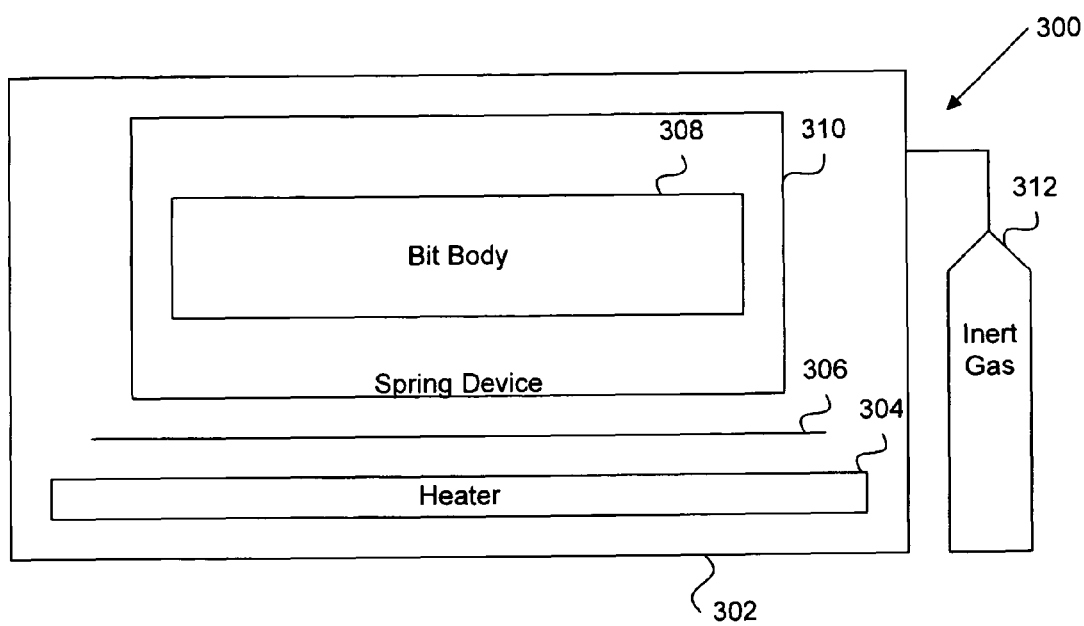
FIG. 3 depicts a system for brazing.

Referring to FIG. 3, an exemplary brazing system 300 is provided, which is capable of performing the methods described herein. The system includes a chamber 302, which houses a heater 304. The chamber can also include a rack, pedestal, or other device 306 for holding bit body 308, and spring device 310. The chamber is in communication with an inert gas source 312 and can be in communication with a vacuum source for evacuating ambient air from the chamber prior to the introduction of the inert gas.

Spring Device

Figure 4:
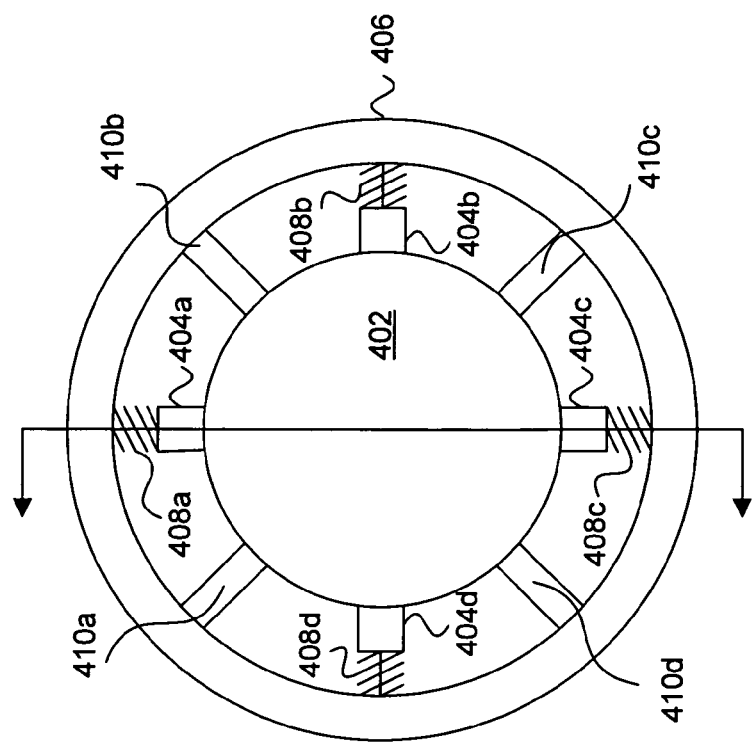
FIG. 4 depicts a spring device for brazing.
Figure 4:
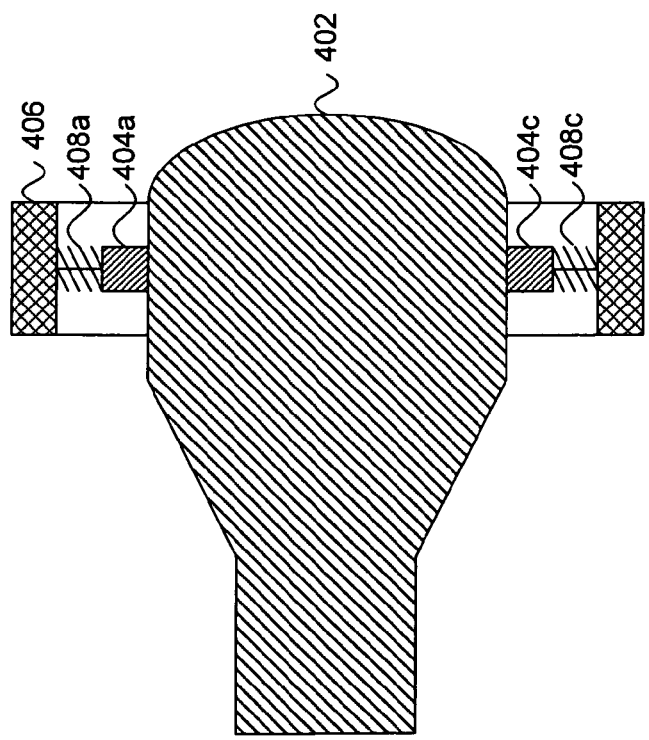

Referring to FIG. 4, an exemplary spring device is provided to hold the cutters in place during the brazing process. As discussed herein, a bit body 402 and one or more cutters 404 are provided. A spring device includes a frame 406 and one or more springs 408 to hold the cutters in place. The frame can include one or more studs 410 to aid in the proper positioning of the frame 406 with respect to the bit body 402.

The frame 406, springs 408, and studs 410 are ideally composed of a material that capable of withstanding brazing temperatures. Suitable materials include various metals and metal alloys such as steel.

The methods and devices herein are not limited to the use of a compression spring 408 as depicted in FIG. 4. Rather, compression spring 408 can be replaced and/or supplemented with a bladder and/or piston system that applies pressure to cutters 404. The use of a hydraulic and/or pneumatic system can increase pressure against the cutter as the pressurized fluid expands, which can be advantageous in some situations.

INCORPORATION BY REFERENCE

All patents, published patent applications, and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

The invention claimed is:

1. A method of brazing cutter teeth, the method comprising:
   providing a bit body having a longitudinal axis along a length of the bit body;
   pressing at least one cutter against the bit body with an external spring device having a frame, external to the at least one cutter and positioned radially outward of the bit body, and at least one spring positioned radially between the frame and the at least one cutter, wherein the spring has a longitudinal axis along a length of the coil, and the longitudinal axis of the spring is non-parallel to the longitudinal axis of the bit body, wherein a quantity of filler metal is held between each of the at least one cutters and the bit body;
   placing the bit body and the at least one cutter in an inert gas filled chamber with about 10% $H_2$; and
   heating the chamber to a temperature above the melting point of the filler metal thereby melting the filler metal.

2. The method of claim 1, wherein the bit body has a interior cavity, the method further comprising:
   introducing a heating element into the interior cavity of the bit body; and
   heating the bit body with the heating element.

3. The method of claim 2, wherein the heating element is an induction coil.

4. The method of claim 2, wherein the bit body is heated in a controlled manner.

5. The method of claim 1, wherein the method results in a brazing thickness of about 0.06 mm.

6. The method of claim 1, wherein the chamber is heated in a controlled manner.

7. The method of claim 1, wherein the cutter teeth comprise polycrystalline diamond.

8. The method of claim 1, wherein the filler metal is silver.

9. The method of claim 1, wherein the filler metal is pre-tinned to the cutter teeth.

10. The method of claim 1, wherein the cutter teeth are brazed in the absence of flux.

11. The method of claim 1, wherein the inert gas is $N_2$.

12. The method of claim 1, wherein the chamber is heated to about 700° C.

13. A method of brazing cutter teeth, the method comprising:
   providing a bit body having a longitudinal axis along a length of the bit body, the bit body having an interior cavity;
   pressing at least one cutter against the bit body with an external spring device having a frame, external to the at least one cutter and positioned radially outward of the bit body, and at least one spring positioned radially between the frame and the at least one cutter, wherein the spring has a longitudinal axis along a length of the coil, and the longitudinal axis of the spring is non-parallel to the longitudinal axis of the bit body, wherein a quantity of silver is held between each of the at least one cutters and the bit body;

placing the bit body and the at least one cutter in an inert gas filled chamber with about 10% $H_2$; and placing an induction element in the interior cavity of the bit body to heat the bit body in a controlled manner;

heating the chamber to a temperature above the melting point of silver thereby melting the silver.

14. The method of claim 13 wherein the method results in a brazing thickness of about 0.06 mm.

15. The method of claim 13 wherein the cutter teeth comprise polycrystalline diamond.

16. The method of claim 13 wherein the silver is pretinned to the cutter teeth.

17. The method of claim 13, wherein the cutter teeth are brazed in the absence of flux.

* * * * *